June 16, 1953   A. W. SIZER   2,642,011
EXTRUSION MACHINE FOR MOLDING PELLETS
AND THE LIKE FROM PLASTIC SUBSTANCES
Filed Feb. 8, 1951   2 Sheets-Sheet 1

June 16, 1953 A. W. SIZER 2,642,011
EXTRUSION MACHINE FOR MOLDING PELLETS
AND THE LIKE FROM PLASTIC SUBSTANCES
Filed Feb. 8, 1951 2 Sheets-Sheet 2

INVENTOR.
Albert W Sizer
BY
John James Victor Armstrong
Attorney

Patented June 16, 1953

2,642,011

UNITED STATES PATENT OFFICE 2,642,011

EXTRUSION MACHINE FOR MOLDING PELLETS AND THE LIKE FROM PLASTIC SUBSTANCES

Albert William Sizer, Hessle, England

Application February 8, 1951, Serial No. 209,988
In Great Britain January 3, 1951

3 Claims. (Cl. 107—8)

1

The present invention relates to improvements in machines for the moulding of cubes, pellets or the like from plastic material such, for instance, as the manufacture of cubes or pellets from meals or meal mixtures and of the type in which the meal is fed between a die ring and at least one moulding roller co-operating with the die ring, said roller and die ring being relatively rotatable, so that the meal is forced through the ports and is cut off in the form of cubes or pellets by means of a knife or breaker bar.

According to the present invention in a machine of the type set forth, the moulding rollers are freely rotatable on a cross-head and are rotatable about eccentric supports mounted on the cross-head and displaceable towards or away from the die ring, for adjustment purposes, by means of a toothed quadrant on the support in engagement with a rotatable worm.

The invention is more particularly described with reference to the accompanying drawings in which.

Figure 1:
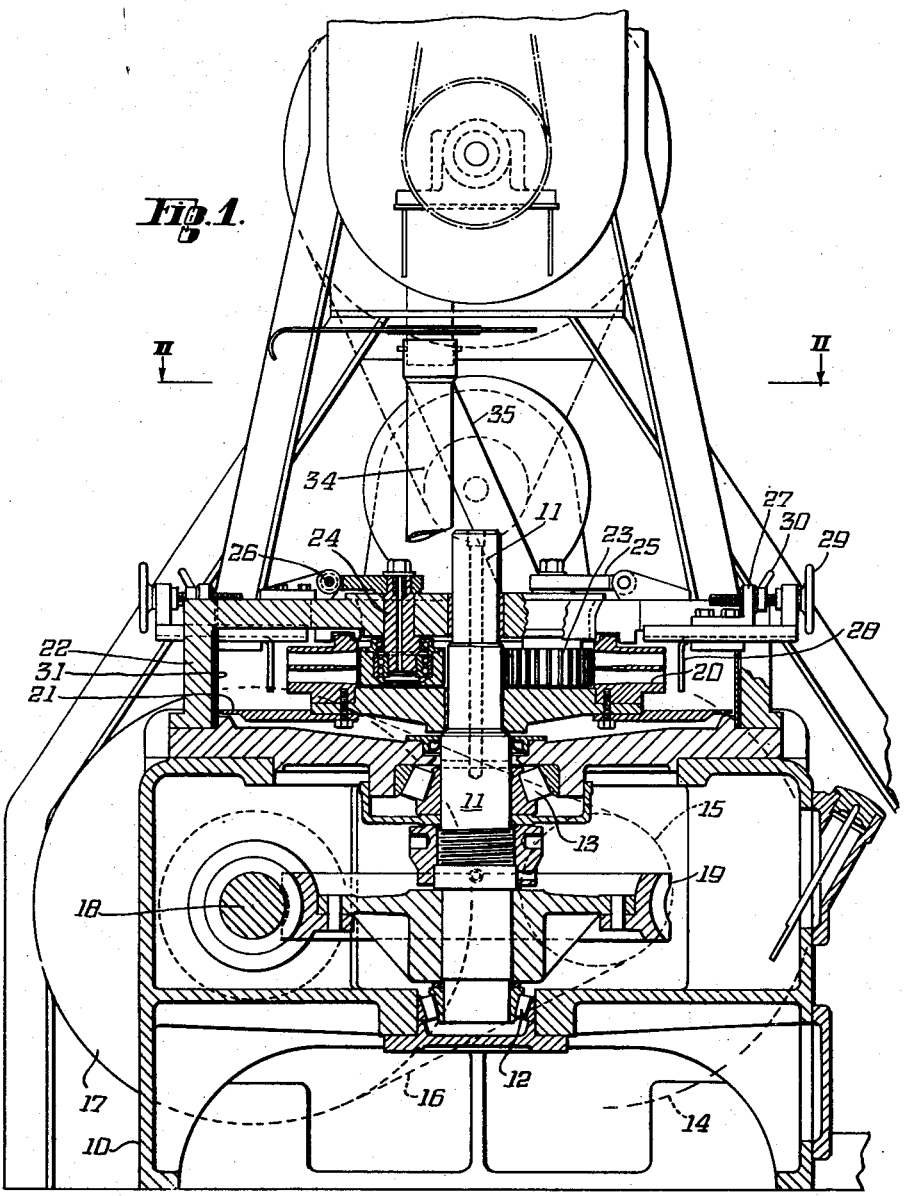
Fig. 1 is a side elevation in section of one form of construction.
Figure 2:
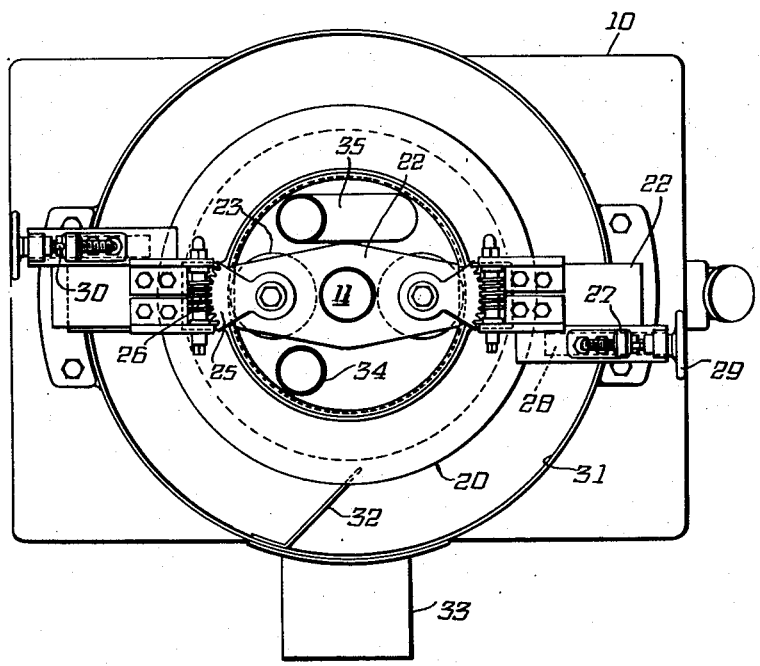
Fig. 2 is a plan view on the line II—II of Fig. 1, certain parts being removed for the sake of clarity.

In the drawings a frame 10 carries a vertical drive shaft 11 in roller bearing assemblies 12, 13. The shaft 11 is rotated by an electric motor indicated at 14 having a pulley wheel indicated at 15 driving a belt indicated at 16 driving a pulley 17 and worm 18 in engagement with the worm wheel 19 keyed to the shaft 11.

A horizontal radially ported annular die ring 20 is bolted to an annular horizontal carrier plate 21 which latter is keyed to the shaft 11 and rotated therewith.

A stationary cross-head 22 is bolted to the frame and is apertured to allow the upper end of the shaft 11 to project therethrough. A pair of moulding rollers 23 are freely rotatable on eccentric supports 24 mounted on the cross-head. The moulding rollers are disposed adjacent the inner periphery of the die ring.

Toothed quadrants 25 are locked to the supports 24 and engage worms 26 mounted on the cross-head. Rotation of the worms 26 thus rotate the supports 24 to displace the rollers 23 towards or away from the die ring, for adjustment purposes.

A pair of members 27 are slidably mounted on the cross-head and each carry a dependent breaker bar 28. The spaced relationship of each breaker bar relative to the die ring is adjustable by means of hand wheels 29 and lock nuts 30.

The frame carries a cylindrical wall element 31 in spaced relationship to the die ring and provided with a sweeper plate 32 and a discharge spout 33.

Meal is fed between the rollers and the die

2 ring down feed tubes 34, 35 from a mixing apparatus (shown diagrammatically) and disposed above the moulding machine.

In operation, the breaker bar may be disposed spaced from (as distinct from being in contact with) the die ring whereby meal forced through the die ring is broken off in the form of cubes or pellets at the die ring only after such time as the meal has been forced out of the die ring to a predetermined length prior to being engaged by the knife or breaker bar at its outer end.

I claim:

1. A moulding machine for plastic substances including in combination a stationary frame, a vertical driving shaft mounted in bearings in said frame, a horizontal radially ported die ring on said shaft, a cross-head fixedly mounted on said frame, a moulding roller disposed within said die ring, a rotatable eccentric support for said moulding roller mounted on the cross-head, a toothed quadrant on said support, and a rotatable worm mounted on said cross-head and in engagement with said toothed quadrant.

2. A moulding machine for plastic substances including in combination a stationary frame, a horizontal radially ported die ring, a vertical shaft carrying said die ring and mounted in said frame, a cross-head on said frame, moulding rollers carried by said cross-head and disposed within said die ring to co-operate therewith, means to provide relative rotation between said cross-head and said die ring, an eccentric support for each moulding roller mounted on said cross-head, and worm and worm wheel adjustment means between said eccentric supports and said cross-head.

3. A moulding machine for plastic substances including in combination a stationary frame, a radially ported die ring, a moulding roller within said die ring co-operating with its inner surface, supports for said moulding roller and said die ring mounted on said frame, a vertical driving shaft in bearings in said frame for rotating one of said supports, an eccentric bush for said moulding roller mounted within its support, a toothed quadrant on this latter support, a rotatable worm engaging said quadrant, and means to provide relative rotation between said supports.

ALBERT WILLIAM SIZER.

References Cited in the file of this patent

UNITED STATES PATENTS

| Number | Name | Date |
|---|---|---|
| 2,144,054 | Hall | Jan. 17, 1939 |
| 2,157,528 | Crabtree | May 9, 1939 |
| 2,160,302 | Billows | May 30, 1939 |
| 2,167,900 | Meakin | Aug. 1, 1939 |
| 2,252,900 | Shafer | Aug. 19, 1941 |
| 2,279,632 | Meakin | Apr. 14, 1942 |